United States Patent
Uchida et al.

(10) Patent No.: US 10,449,952 B2
(45) Date of Patent: Oct. 22, 2019

(54) HYBRID VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Kenji Uchida, Nagoya (JP); Yoshizo Akita, Anjo (JP); Tadaaki Watanabe, Anjo (JP); Mitsuru Maeda, Anjo (JP)

(73) Assignees: Toyota Jidosha Kabushiki Kaisha, Yotoa-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 0 days.

(21) Appl. No.: 15/821,494

(22) Filed: Nov. 22, 2017

(65) Prior Publication Data

US 2018/0170361 A1 Jun. 21, 2018

(30) Foreign Application Priority Data

Dec. 20, 2016 (JP) .................................. 2016-246741

(51) Int. Cl.
*B60W 20/40* (2016.01)
*B60W 10/06* (2006.01)
(Continued)

(52) U.S. Cl.
CPC .............. *B60W 20/40* (2013.01); *B60K 6/445* (2013.01); *B60W 10/06* (2013.01); *B60W 10/10* (2013.01); *B60W 10/30* (2013.01); *B60W 20/15* (2016.01); *F16H 61/0031* (2013.01); *B60K 6/00* (2013.01); *B60W 20/00* (2013.01); *B60W 2510/0638* (2013.01); *B60W 2520/10* (2013.01); *B60W 2710/06* (2013.01); *B60W 2710/30* (2013.01);
(Continued)

(58) Field of Classification Search
CPC ................................................... F16H 61/0031
See application file for complete search history.

(56) References Cited

U.S. PATENT DOCUMENTS 7,846,060 B2 * 12/2010 Kanayama ............. B60K 6/445
477/3
2007/0173370 A1 7/2007 Kanayama et al.
(Continued)

FOREIGN PATENT DOCUMENTS

JP 2001-206088 7/2001
JP 2005-329787 A 12/2005
(Continued)

*Primary Examiner* — Derek D Knight
(74) *Attorney, Agent, or Firm* — Finnegan, Henderson, Farabow, Garrett & Dunner, LLP

(57) ABSTRACT

A hybrid vehicle is equipped with a drive unit, and an automatic transmission. The automatic transmission includes engagement elements that can transmit power between the drive unit and driving wheels. The drive unit includes an engine, a first motor generator, a second motor generator, and a planetary gear mechanism. The hybrid vehicle is further equipped with a mechanical oil pump and an electrical oil pump, and a controller. The controller continues operating the electrical oil pump while the internal combustion engine is not in operation after the internal combustion engine is stopped as a result of a system stop operation by a user while the vehicle is running at a vehicle speed equal to or higher than a predetermined value.

7 Claims, 7 Drawing Sheets

(51) Int. Cl.
- *B60W 10/10* (2012.01)
- *B60W 10/30* (2006.01)
- *B60K 6/445* (2007.10)
- *F16H 61/00* (2006.01)
- *B60W 20/15* (2016.01)
- *B60K 6/00* (2006.01)
- *B60W 20/00* (2016.01)

(52) U.S. Cl.
CPC ....... *B60Y 2200/92* (2013.01); *F16H 2312/14* (2013.01); *Y02T 10/48* (2013.01); *Y02T 10/6239* (2013.01); *Y02T 10/7258* (2013.01); *Y10S 903/93* (2013.01)

(56) References Cited

U.S. PATENT DOCUMENTS

| | | |
|---|---|---|
| 2008/0064562 A1 | 3/2008 | Aettel et al. |
| 2010/0004089 A1 | 1/2010 | Iwase et al. |

FOREIGN PATENT DOCUMENTS

| | | |
|---|---|---|
| JP | 2006-46487 | 2/2006 |
| JP | 2007-196755 A | 8/2007 |

* cited by examiner

|       | C1 | C2 | B1 | B2 | F1 |
|-------|----|----|----|----|----|
| 1st/Rev | O |    |    | O  | O  |
| 2nd   | O  |    | O  |    |    |
| 3rd   | O  | O  |    |    |    |
| 4th   |    | O  | O  |    |    |
| N     |    |    |    |    |    |

POWER TRANSMITTING STATE (AT CLUTCHES ENGAGED)

NEUTRAL STATE

O : ENGAGED

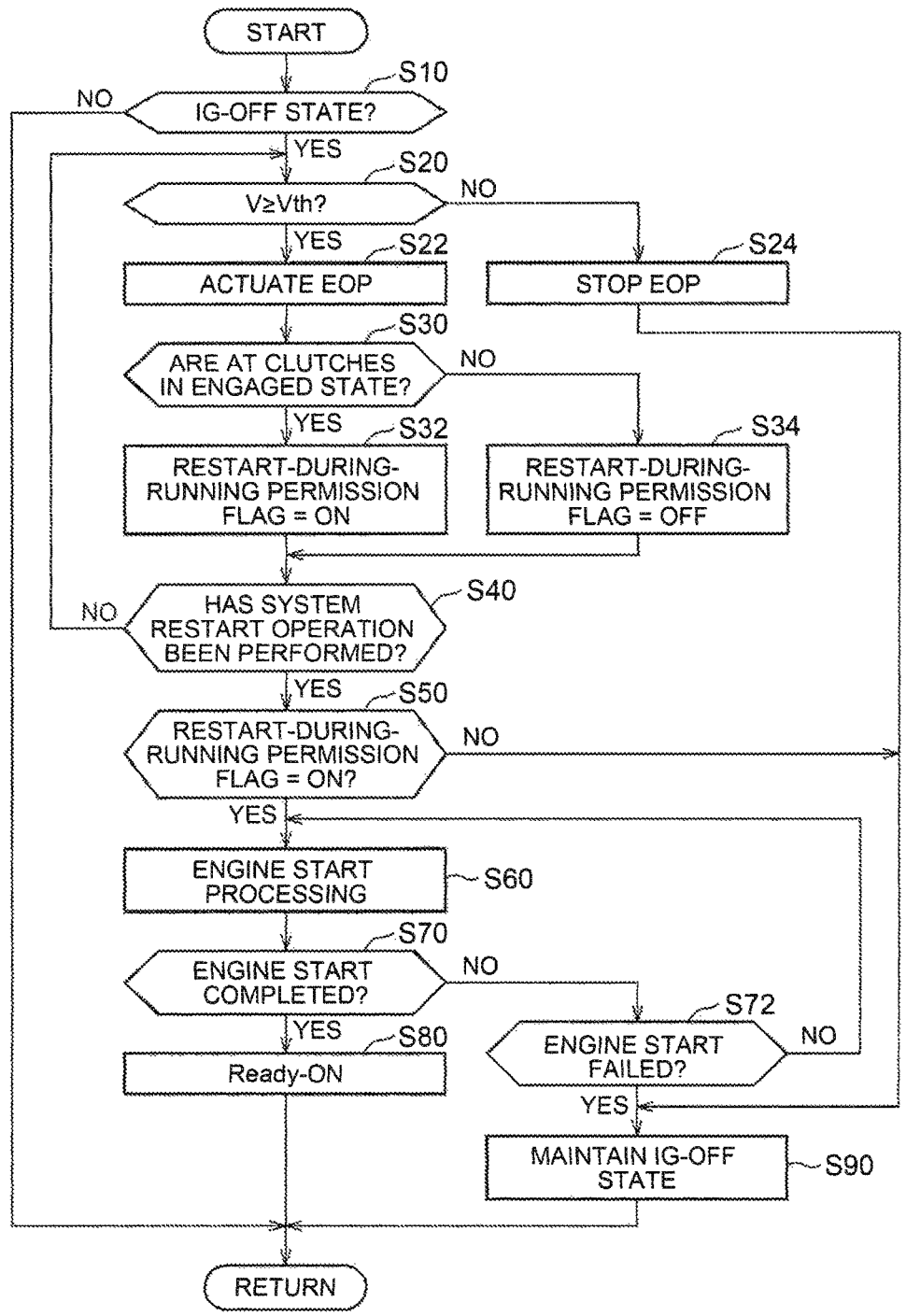

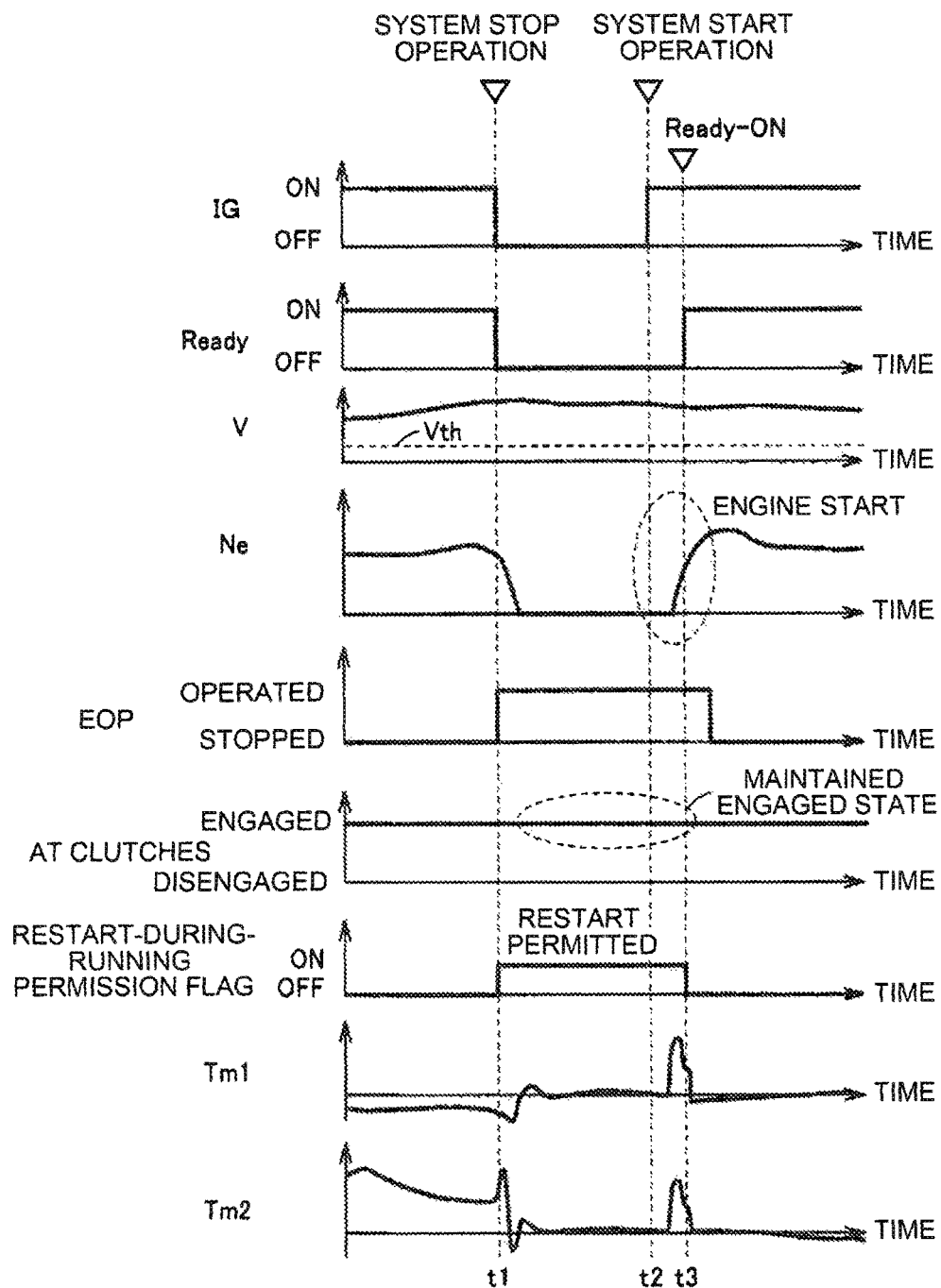

HYBRID VEHICLE

INCORPORATION BY REFERENCE

The disclosure of Japanese Patent Application No. 2016-246741 filed on Dec. 20, 2016 including the specification, drawings and abstract is incorporated herein by reference in its entirety.

BACKGROUND

1. Technical Field

This disclosure relates to a hybrid vehicle, and more particularly, to a technology to start an internal combustion engine that is mounted in a hybrid vehicle.

2. Description of Related Art

Japanese Patent Application Publication No. 2006-46487 (JP 2006-46487 A) discloses a hybrid vehicle that is equipped with a drive unit that includes an engine, a first motor generator and a second motor generator, a transmission that is provided between the drive unit and driving wheels, and a mechanical oil pump that uses engine power to generate hydraulic pressure.

The transmission includes an input shaft that is connected to the drive unit, an output shaft that is connected to the driving wheels, and a hydraulic frictional engagement element. The frictional engagement element is configured to be brought into an engaged state that allows power to be transmitted between the input shaft and the output shaft of the transmission by hydraulic pressure that is generated by the mechanical oil pump.

In the above hybrid vehicle, the power that is generated by the drive unit is transmitted to the driving wheels via the transmission when the frictional engagement element of the transmission is in the engaged state.

SUMMARY

In the hybrid vehicle that is disclosed in JP 2006-46487 A, when the frictional engagement element of the transmission is not in the engaged state, it is technically very difficult to use the first and second motor generators to start the engine because the input shaft of the transmission is in a free state in which the input shaft is not connected to the driving wheels. Thus, when the engine is stopped as a result of a system stop operation by the user and consequently the mechanical oil pump stops while the vehicle is running, the frictional engagement element of the transmission cannot be maintained in the engaged state. As a result, a state is established where the engine cannot be restarted even if the user performs a system restart operation while the vehicle is running. This raises concern that the convenience of the user is deteriorated.

This disclosure has been made to solve the above problem. Therefore, an object of this disclosure is to prevent a hybrid vehicle that is equipped with a transmission between a drive unit and driving wheels from falling into a situation where the engine cannot be restarted after the engine is stopped as a result of a system stop operation by the user while the vehicle is running.

A hybrid vehicle according to an aspect of this disclosure includes a drive unit that generates driving force and a transmission that is provided between the drive unit and driving wheels. The transmission includes an input shaft that is connected to the drive unit, an output shaft that is connected to the driving wheels, and engagement elements that are brought into an engaged state that allows power to be transmitted between the input shaft and the output shaft by hydraulic pressure that is externally supplied. The drive unit includes an internal combustion engine, a first rotating electric machine, a planetary gear mechanism mechanically connecting the internal combustion engine, the first rotating electric machine and the input shaft of the transmission, and a second rotating electric machine coupled to the input shaft of the transmission. The hybrid vehicle further includes a mechanical pump using power from the internal combustion engine to generate hydraulic pressure that is supplied to the engagement elements, an electrical pump using electric power to generate hydraulic pressure that is supplied to the engagement elements, and a controller controlling the drive unit, the transmission, and the electrical pump. The controller continues operating the electrical pump while the internal combustion engine is not in operation after the internal combustion engine is stopped as a result of a system stop operation by a user while the hybrid vehicle is running at a vehicle speed equal to or higher than a predetermined value.

According to the above aspect, when the internal combustion engine is stopped by a system stop operation while the vehicle is running, the electrical pump continues to be operated. Thus, hydraulic pressure necessary to bring the engagement elements of the transmission into the engaged state can be supplied from the electrical pump even when the internal combustion engine is stopped and consequently the mechanical pump stops while the vehicle is running. This prevents the vehicle from falling into a situation where the internal combustion engine cannot be restarted even when the internal combustion engine is stopped by a system stop operation while the vehicle is running.

According to an aspect of the disclosure, the controller may perform start processing to start the internal combustion engine in response to a system start operation by the user when the engagement elements are in the engaged state while the electrical pump continues to be operated. The controller may not perform the start processing regardless of the system start operation when the engagement element are not in the engaged state while the electrical pump continues to be operated.

According to the above aspect, when the engagement elements are in the engaged state while the electrical pump continues to be operated, start processing to start the internal combustion engine is executed in response to a system start operation by the user because the input shaft of the transmission is connected to the driving wheels and therefore it is able to restart the internal combustion engine. Thus, it is able to restart the internal combustion engine even while the vehicle is running. On the other hand, when the engagement elements are not in the engaged state while the electrical pump continues to be operated, the start processing is not executed regardless of a system start operation because the input shaft of the transmission is in a free state in which the input shaft is not connected to the driving wheels and therefore it is difficult to restart the internal combustion engine. Thus, it is possible to avoid executing processing to start the internal combustion engine unnecessarily in a situation where the internal combustion engine is difficult to be restarted.

According to an aspect of the disclosure, the controller may terminate the start processing and maintain the internal combustion engine in a stopped state when the internal combustion engine is not started by the start processing.

According to the above configuration, the start processing is terminated when the internal combustion engine is not started by the start processing. Thus, it is possible to avoid continuing processing to start the internal combustion engine unnecessarily in a situation where the internal combustion engine cannot be restarted for some reason.

According to an aspect of the disclosure, the controller may stop the electrical pump and maintain the internal combustion engine in a stopped state when the vehicle speed falls below the predetermined value while the electrical pump continues to be operated.

When the vehicle speed is lower than a predetermined value (several kilometer per hour, for example), the vehicle can come to a halt immediately and it is assumed that an urgent situation that requires a system restart is unlikely to occur while the vehicle is running. Thus, the controller according to the above configuration stops the electrical pump and maintains the internal combustion engine in a stopped state when the vehicle speed falls below the predetermined value while the electrical pump continues to be operated. Thus, it is possible to avoid continuing operating the electrical pump unnecessarily.

According to an aspect of the disclosure, the controller may maintain the electrical pump in a stopped state before the internal combustion engine is stopped.

Before the internal combustion engine is stopped, the hydraulic pressure that is supplied to the engagement elements is generated by the mechanical pump, which is driven by power from the internal combustion engine. Therefore, the electrical pump may be deactivated. Thus, it is possible to avoid continuing operating the electrical pump unnecessarily.

According to an aspect of the disclosure, the controller may maintain the electrical pump in a stopped state when a predetermined condition is satisfied after performing the start processing to start the internal combustion engine in response to the system start operation by the user. The predetermined condition may be a condition in which a rotational speed of the internal combustion engine is equal to or higher than a predetermined rotational speed.

After start processing to start the internal combustion engine is executed, the start of the internal combustion engine is considered to have been completed at a time, for example, at which a rotational speed of the internal combustion engine is equal to or higher than a predetermined rotational speed. In this case, the hydraulic pressure that is supplied to the engagement elements is generated by the mechanical pump, which is driven by power from the internal combustion engine. Therefore, the electrical pump may be deactivated. Thus, it is possible to avoid continuing to operate the electrical pump unnecessarily.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart that illustrates one example of a processing procedure that is executed by an ECU; and FIG. 8 is a timing chart that illustrates one example of changes in states that occur when a system stop operation and a system start operation are performed while the vehicle is running.

DETAILED DESCRIPTION OF EMBODIMENTS

Figure 1:
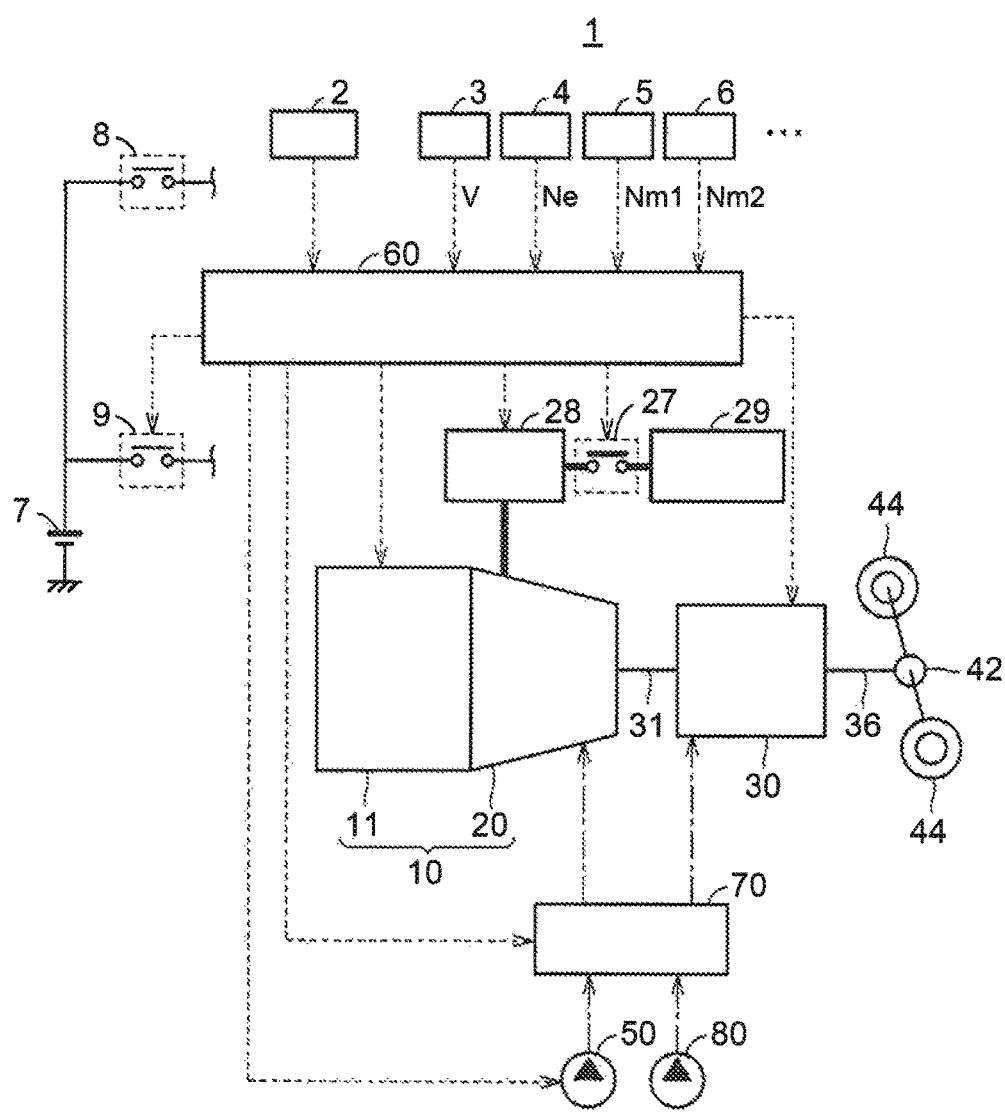
FIG. 1 is a general configuration diagram of a vehicle.

An embodiment of this disclosure is hereinafter described in detail with reference to the drawings. The same or corresponding parts are designated by the same reference numerals or symbols in all the drawings and their description is not repeated.

FIG. 1 is a general configuration diagram of a vehicle 1 according to this embodiment. The vehicle 1 is equipped with a drive unit 10, an automatic transmission 30, a differential gear mechanism 42, driving wheels 44, and an ECU (Electronic Control Unit) 60.

The drive unit 10 includes an engine 11 and a differential unit 20. The engine 11 is an internal combustion engine that is constituted of a gasoline engine or diesel engine, for example. The differential unit 20 is coupled to the engine 11. The differential unit 20 includes motor generators, and a power split device that divides the output from the engine 11 among the automatic transmission 30 and the motor generators (refer to FIG. 2, which is described later).

The automatic transmission 30 is provided between the differential unit 20 of the drive unit 10 and the differential gear mechanism 42 (the driving wheels 44). The automatic transmission 30 is configured to be able to change a transmission gear ratio (gear position) which is a ratio between the rotational speed of an input shaft 31 that is connected to the differential unit 20 and the rotational speed of an output shaft 36 that is connected to the differential gear mechanism 42 (the driving wheels 44). The configuration of the drive unit 10 and the automatic transmission 30 is described in detail later.

The differential gear mechanism 42 is coupled to the output shaft 36 of the automatic transmission 30 and transmits the power that is output from the automatic transmission 30 to the driving wheels 44.

The vehicle 1 is further equipped with a system main relay (which is hereinafter referred to also as "SMR") 27, a PCU (Power Control Unit) 28, and an electrical energy storage device 29.

The electrical energy storage device 29 is a secondary battery that stores electric power that is used to drive the vehicle 1. The electrical energy storage device 29 may be a high-capacity capacitor.

The SMR 27 is opened and closed in response to control signals from the ECU 60. The electrical energy storage device 29 is connected to the PCU 28 when the SMR 27 is closed, and the electrical energy storage device 29 is disconnected from the PCU 28 when the SMR 27 is opened.

The PCU 28 is electrically connected to the electrical energy storage device 29 via the SMR 27, and supplies electric power in the electrical energy storage device 29 to the motor generators of the differential unit 20 to drive the motor generators or supplies electric power that is generated by the motor generators of the differential unit 20 to the electrical energy storage device 29 to charge the electrical energy storage device 29 on the basis of control signals from the ECU 60.

The vehicle 1 is further equipped with an electrical oil pump (which is hereinafter referred to also as "EOP") 50, a mechanical oil pump (which is hereinafter referred to also as "MOP") 80, and a hydraulic circuit 70.

The EOP 50 is driven by electric power that is supplied from an auxiliary machine battery 7, which is described later (more specifically, power of a motor (not shown) that is operated by electric power that is supplied from the auxiliary machine battery 7), and sucks oil that is retained in an oil pan and supplies the sucked oil to the hydraulic circuit 70. Thus, even when the engine 11 is stopped, the EOP 50 can be driven. The output hydraulic pressure from the EOP 50 is controlled by command signals from the ECU 60.

On the other hand, the MOP 80 is driven by power from the engine 11, and sucks oil that is retained in the oil pan and supplies the sucked oil to the hydraulic circuit 70. Thus, the MOP 80 is driven when the engine 11 is operated and the MOP 80 stops when the engine 11 is stopped.

The hydraulic circuit 70 supplies oil from at least one of the EOP 50 and the MOP 80 to the differential unit 20 and the automatic transmission 30. The oil that is supplied to the differential unit 20 and the automatic transmission 30 acts as lubricating oil and cooling oil for the differential unit 20 and the automatic transmission 30. The dot-and-dash lines in FIG. 1 indicate the flow of oil.

The hydraulic circuit 70 is provided with a linear solenoid valve (not shown) that adjusts hydraulic pressure for engaging frictional engagement elements (described later) in the automatic transmission 30. The linear solenoid valve generates hydraulic pressure corresponding to a hydraulic pressure command value from the ECU 60, and supplies the generated hydraulic pressure to the frictional engagement elements (described later) in the automatic transmission 30. Then, frictional engagement elements in the automatic transmission 30 are brought into an engaged state (a state where power is able to be transmitted between the input shaft 31 and the output shaft 36 of the automatic transmission 30).

The vehicle 1 is further equipped with a push switch 2, an auxiliary machine battery 7, an IG (ignition) relay 8, and an IGCT relay 9.

The push switch 2 is an operating switch that a user uses to input a system start operation and a system stop operation. The system start operation is an operation to activate a vehicle system (machines and devices necessary to drive the vehicle 1) including the ECU 60. The system stop operation is an operation to deactivate the vehicle system.

The auxiliary machine battery 7 is a secondary battery that stores electric power with a relatively low voltage that is used to operate auxiliary machines of the vehicle 1, including the ECU 60 and the EOP 50. The auxiliary machine battery 7 typically includes a lead battery. The auxiliary machine battery 7 is connected to the auxiliary machines via the IG relay 8 and the IGCT relay 9.

The IG relay 8 is closed in response to a system start operation and is opened in response to a system stop operation. When the IG relay 8 is in a closed state (which is hereinafter referred to also as "IG-on state"), the auxiliary machine battery 7 is connected to the auxiliary machines and electric power is supplied from the auxiliary machine battery 7 to the auxiliary machines. On the other hand, when the IG relay 8 is in an open state (which is hereinafter referred to also as "IG-off state"), electric power from the auxiliary machine battery 7 is not supplied to the auxiliary machines via the IG relay 8.

On the other hand, the IGCT relay 9 is opened and closed in response to control signals from the ECU 60. When the IGCT relay 9 is in a closed state, the auxiliary machine battery 7 is connected to some of the auxiliary machines including the ECU 60 and the EOP 50, and electric power is supplied thereto from the auxiliary machine battery 7. Thus, even in the IG-off state, electric power continues to be supplied to some of the auxiliary machines including the ECU 60 and the EOP 50 as long as the IGCT relay 9 is in the closed state.

When the user performs a system start operation with the push switch 2, the IG-on state is established and the vehicle system including the ECU 60 is activated. After that, the ECU 60 executes engine start processing to start the engine 11. Then, when the engine 11 is started by the engine start processing, the ECU 60 closes the SMR 27 to bring a vehicle control state into a Ready-ON state. In the Ready-ON state, the ECU 60 allows the drive unit 10 to generate driving force in response to an accelerator pedal operation by the user.

When the user performs a system stop operation with the push switch 2 in the Ready-ON state, the IG-off state is established. At this time, electric power continues to be supplied to some of the auxiliary machines including the ECU 60 and the EOP 50 from the auxiliary machine battery 7 via the IGCT relay 9.

When the IG-off state is established, the ECU 60 brings the vehicle control state to a Ready-OFF state. In the Ready-OFF state, the engine 11 is stopped and the PCU 28 is deactivated. Thus, in the Ready-OFF state, no driving force is generated even when the user operates the accelerator pedal. After that, when a predetermined condition is satisfied, the ECU 60 opens the IGCT relay 9 by itself to deactivate the entire vehicle system including the ECU 60.

The vehicle 1 is further provided with a vehicle speed sensor 3, and rotational speed sensors 4 to 6. The vehicle speed sensor 3 detects a vehicle speed V. The rotational speed sensor 4 detests a rotational speed Ne of the engine 11. The rotational speed sensor 5 detects a rotational speed Nm of a motor generator MG1, which is described later. The rotational speed sensor 6 detects a rotational speed Nm2 of a motor generator MG2, which is described later. These sensors output detection results to the ECU 60. Although not shown, the vehicle 1 is further provided with a plurality of sensors for detecting various physical quantities necessary to control the vehicle 1, such as an accelerator pedal operation amount (the amount by which the accelerator pedal is operated by the user) and a shift position (the position of a shift lever that is operated by the user). These sensors send detection results to the ECU 60.

The ECU 60 incorporates a CPU (Central Processing Unit) and a memory (which are not shown). The ECU 60 executes predetermined arithmetic processing on the basis of information from the sensors and information that has been stored in the memory, and controls various machines and devices of the vehicle 1 on the basis of an result of the arithmetic processing. For example, the ECU 60 controls conditions of the automatic transmission 30 on the basis of a shift chart (not shown) that includes the accelerator pedal operation amount, the vehicle speed V and so on as parameters.

Figure 2:
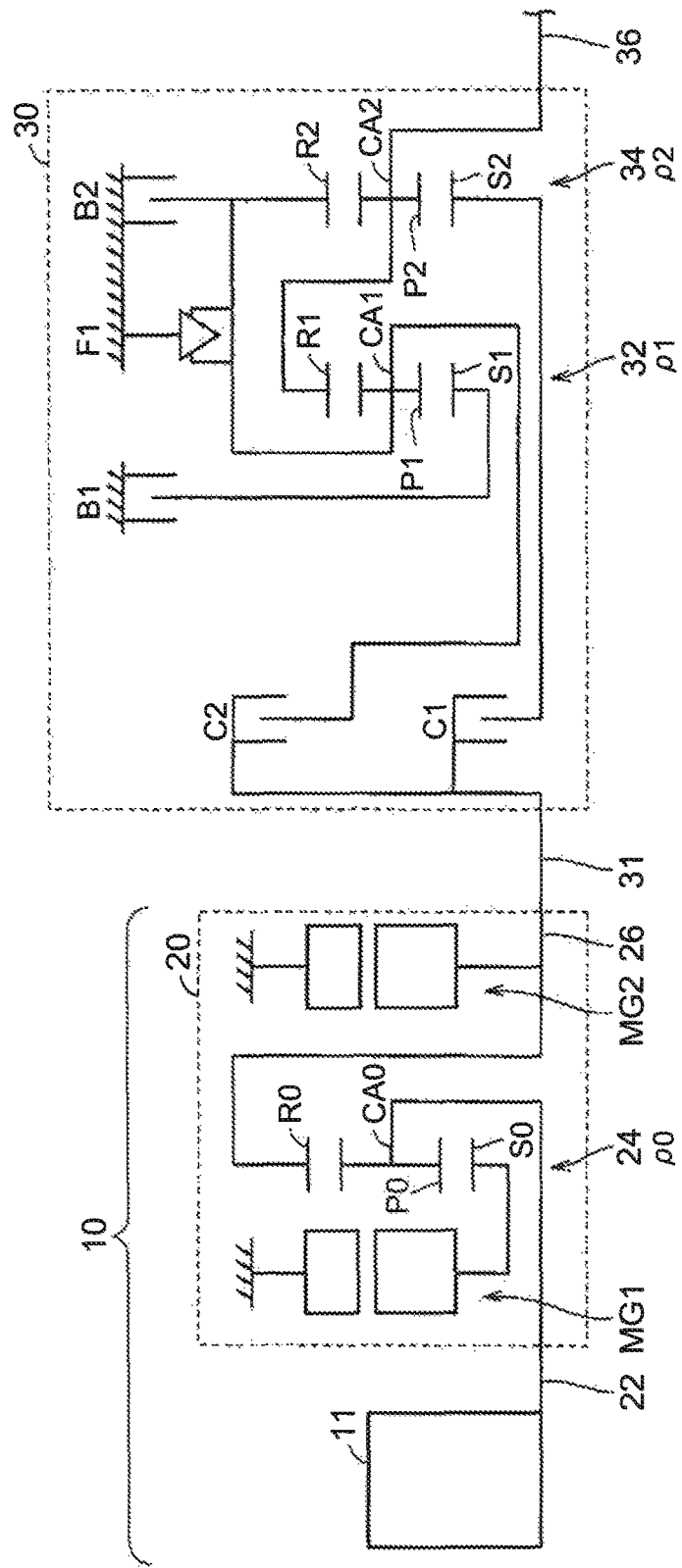
FIG. 2 is a diagram that illustrates one example of the configuration of a drive unit and an automatic transmission.

FIG. 2 is a diagram that illustrates one example of the configuration of the drive unit 10 (the engine 11 and the differential unit 20) and the automatic transmission 30, which are shown in FIG. 1. Because the engine 11, the differential unit 20 and the automatic transmission 30 are configured symmetrically with respect to their central axes, lower halves of the engine 11, the differential unit 20 and the automatic transmission 30 are not shown in FIG. 2.

The differential unit 20 includes a motor generator MG1 (first motor generator), a motor generator MG2 (second motor generator), and a power split device 24. The motor generators MG1 and MG2 are AC electric rotating machines and are driven by the PCU 28 (FIG. 1).

The power split device 24 is constituted of a single-pinion type planetary gear (planetary gear mechanism), and includes a sun gear S0, a pinion gear P0, a carrier CA0, and a ring gear R0. The carrier CA0 is coupled to a crankshaft 22 of the engine 11, and supports the pinion gear P0 so that the pinion gear P0 is able to rotate around to its axis and also is able revolve around the sun gear S0. The sun gear S0 is coupled to a rotating shaft of the motor generator MG1. The ring gear R0 is coupled to the input shaft 31 of the automatic transmission 30, and configured to mesh with the sun gear S0 via the pinion gear P0. A rotating shaft of the motor generator MG2 is coupled to the input shaft 31 of the automatic transmission 30. In other words, the ring gear R0 is also coupled to the rotating shaft of the motor generator MG2.

The power split device 24 functions as a differential device when the sun gear S0, the carrier CA0 and the ring gear R0 rotate relative to each other. The rotational speeds of the sun gear S0, the carrier CA0 and the ring gear R0 have such a relationship that they are connected by a straight line on a nomograph (refer to FIG. 4 and so on) as described later. By a differential function of the power split device 24, the power that is output from the engine 11 is divided among the sun gear S0 and the ring gear R0. Then, the motor generator MG1 is operated as a power generator by the power that is distributed to the sun gear S0, and the electric power that is generated by the motor generator MG1 is supplied to the motor generator MG2 or stored in the electrical energy storage device 29 (shown in FIG. 1).

The automatic transmission 30 includes single-pinion type planetary gears 32 and 34, clutches C1 and C2, brakes B1 and B2, and a one-way clutch F1. The planetary gear 32 includes a sun gear S1, a pinion gear P1, a carrier CA1, and a ring gear R1. The planetary gear 34 includes a sun gear S2, a pinion gear P2, a carrier CA2, and a ring gear R2.

Each of the clutches C and C2 and the brakes B1 and B2 is a frictional engagement element that is hydraulically operated. Each frictional engagement element is constituted of a wet multiple disc clutch in which stacked multiple friction plates are hydraulically pressed against each other or a band brake in which one end of a band entrained around an outer peripheral surface of a rotating drum is hydraulically tightened, for example.

The clutches C1 and C2 are coupled to the input shaft 31 of the automatic transmission 30. The one-way clutch F1 supports the carrier CA1 and the ring gear R2, which are coupled to each other, in such a manner that they can rotate in a negative direction (vehicle reversing direction) but cannot rotate in a positive direction (vehicle forwarding direction). The carrier CA2 of the planetary gear 34 is coupled to the output shaft 36 of the automatic transmission 30.

Figures 3, 4:
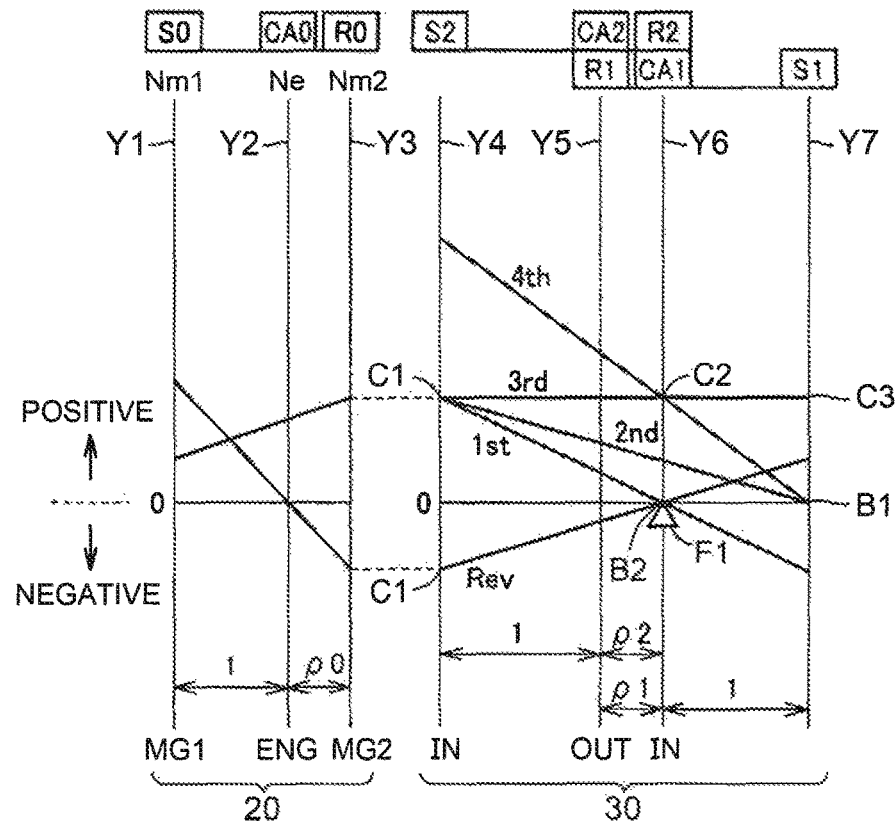
FIG. 3 is a diagram that shows an engagement operation table for the automatic transmission.
FIG. 4 is a nomograph of a transmission mechanism that is constituted of a differential unit and the automatic transmission.

FIG. 3 is a diagram that shows an engagement operation table for the automatic transmission 30. The clutches C1 and C2, the brakes B1 and B2 and the one-way clutch F1 are engaged according to the engagement operation table in FIG. 3, whereby one of first to fourth gear positions (forward gear positions) and a reverse gear position is selectively formed. In FIG. 3, "○ (circle)" indicates an engaged state, and a blank indicates a disengaged state. In addition, "N" indicates a neutral state (state where no power is transmitted).

In the following, for convenience of description, frictional engagement elements as engagement targets among the clutches C1 and C2 and the brakes B1 and B2 are also referred to as "AT clutches." For example, when a second gear position is formed, the clutch C1 and the brake B1 are the "AT clutches."

When any of the first to fourth gear positions is formed, the AT clutches are in an engaged state to allow power to be transmitted between the input shaft 31 and the output shaft 36 of the automatic transmission 30. On the other hand, in the neutral state, all of the clutches C1 and C2 and the brakes B1 and B2 are controlled to be in a disengaged state to establish a state where no power can be transmitted between the input shaft 31 and the output shaft 36.

FIG. 4 is a nomograph of a transmission mechanism that is constituted of the differential unit 20 and the automatic transmission 30. A vertical line Y1 in the nomograph, which corresponds to the differential unit 20, indicates the rotational speed of the sun gear S0 of the power split device 24 (in other words, the rotational speed Nm1 of the motor generator MG1). A vertical line Y2 indicates the rotational speed of the carrier CA0 of the power split device 24 (in other words, the rotational speed Ne of the engine 11). A vertical line Y3 indicates the rotational speed of the ring gear R0 of the power split device 24 (in other words, the rotational speed Nm2 of the motor generator MG2). The distances between the vertical lines Y1 to Y3 are determined on the basis of a gear ratio ρ0 of the power split device 24.

A vertical line Y4 in the nomograph, which corresponds to the automatic transmission 30, indicates the rotational speed of the sun gear S2 of the planetary gear 34. A vertical line Y5 indicates the rotational speed of the carrier CA2 of the planetary gear 34 and the ring gear R1 of the planetary gear 32, which are coupled to each other. A vertical line Y6 indicates the rotational speed of the ring gear R2 of the planetary gear 34 and the carrier CA1 of the planetary gear 32, which are coupled to each other. A vertical line Y7 indicates the rotational speed of the sun gear S1 of the planetary gear 32. The distances between the vertical lines Y4 to Y7 are determined on the basis of a gear ratio ρ1 of the planetary gear 32 and a gear ratio ρ2 of the planetary gear 34.

When the clutch C1 is engaged, the sun gear S2 of the planetary gear 34 of the automatic transmission 30 is coupled to the ring gear R0 of the differential unit 20, and the sun gear S2 rotates at the same speed as the ring gear R0. Thus, when the clutch C1 is engaged, the vertical line Y4, which indicates the rotational speed of the sun gear S2, indicates the rotational speed of the ring gear R0 of the differential unit 20 (which is the same as the rotational speed of the input shaft 31 of the automatic transmission 30).

On the other hand, when the clutch C2 is engaged, the carrier CA1 of the planetary gear 32 and the ring gear R2 of the planetary gear 34 in the automatic transmission 30 are coupled to the ring gear R0 of the differential unit 20, and the carrier CA1 and the ring gear R2 rotate at the same speed as the ring gear R0. Thus, when the clutch C2 is engaged, the vertical line Y6, which indicates the rotational speed of the carrier CA1 and the ring gear R2, indicates the rotational speed of the ring gear R0 of the differential unit 20 (which is the same as the rotational speed of the input shaft 31 of the automatic transmission 30).

The vertical line Y5, which indicates the rotational speed of the carrier CA2 of the planetary gear 34, indicates an output rotational speed of the automatic transmission 30 (the rotational speed of the output shaft 36).

For example, when the clutch C1 and the brake B1 are engaged and the other clutches and brake are disengaged to form a second gear position (2nd) as shown in the engagement operation table in FIG. 3, the nomograph of the automatic transmission 30 has a straight line as indicated by "2nd."

Also, when the clutch C1 and the brake B2 are engaged and the other clutches and brake are disengaged as shown in the engagement operation table in FIG. 3, a first gear position (1st) or reverse gear position (Rev) is formed depending on the rotating state of the motor generator MG2. When the motor generator MG2 (the ring gear R0) is rotating in a positive direction, the nomograph of the automatic transmission 30 has a straight line as indicated by "1st." On the other hand, when the motor generator MG2 (the ring gear R0) is rotating in a negative direction, the nomograph of the automatic transmission 30 has a straight line as indicated by "Rev."

In this way, in the automatic transmission 30, the first to fourth gear positions, the reverse gear position and the neutral state can be selectively formed by engaging or disengaging the clutches C1 and C2 and the brakes B1 and B2 according to the engagement operation table in FIG. 3.

On the other hand, in the differential unit 20, a continuously variable speed change can be achieved by which the rotational speed of the ring gear R0, in other words, the rotational speed of the input shaft 31 of the automatic transmission 30 can be continuously changed relative to a predetermined rotational speed of the engine 11, which is coupled to the carrier CA0, by appropriately controlling the rotation of the motor generators MG1 and MG2.

The vehicle 1 according to this embodiment is provided with a function of accepting a system stop operation even when the vehicle 1 is running so that the user can bring the vehicle system to an emergency stop.

Specifically, when the user performs a system stop operation to establish the IG-off state while the vehicle 1 is running in the Ready-ON state, the ECU 60 brings the vehicle control state into the Ready-OFF state. Then, a state is established where no vehicle driving force is generated even if the user operates the accelerator. Even in the IG-off state, the ECU 60 maintains the IGCT relay 9 and the SMR 27 in the closed state while the vehicle 1 is running. Thus, some of the auxiliary machines including the ECU 60 and the EOP 50 are operable and electric power can be supplied from the electrical energy storage device 29 to the motor generators MG1 and MG2.

As described above, in the vehicle 1 according to this embodiment, the vehicle control state is allowed to be brought into the Ready-OFF state in response to a system stop operation even while the vehicle is running.

However, if the user performs a system stop operation erroneously while the vehicle is running, it is assumed that the user wishes to return the vehicle control state to the Ready-ON state immediately.

Thus, the vehicle 1 according to this embodiment is provided with a function of accepting a system start operation (an operation to restart the vehicle system) while the vehicle 1 is running when the Ready-OFF state has been established by a system stop operation while the vehicle 1 is running so that the vehicle control state can be returned to the Ready-ON state while the vehicle 1 is running.

When the system is restarted while the vehicle 1 is running, the return to the Ready-ON state is permitted with an essential condition that the engine 11 is started so that the user can recognize the restart of the system in contrast to a normal system activation that is performed in a state in which the vehicle 1 is stopped. Specifically, when the user performs a system start operation while the vehicle 1 is running inertially in the IG-off state, the ECU 60 performs engine start processing. Then, the ECU 60 returns the vehicle control state to the Ready-ON state on condition that the start of the engine 11 is completed by the engine start processing. As a result, a state is established where vehicle driving force is generated in response to an accelerator operation by the user.

As described above, when a system start operation (system restart operation) is performed while the vehicle 1 is running inertially in the IG-off state, the ECU 60 performs engine start processing, and returns the vehicle control state to the Ready-ON state on condition that the start of the engine 11 is completed by the engine start processing.

However, if no AT clutch is engaged when engine start processing is performed while the vehicle 1 is running inertially in the IG-off state, it is technically very difficult to start the engine 11 because the ring gear R0 of the power split device 24 (the input shaft 31 of the automatic transmission 30) is in a free state in which the input shaft 31 is not connected to the driving wheels 44. In this regard, detailed description is made below.

Figure 5:
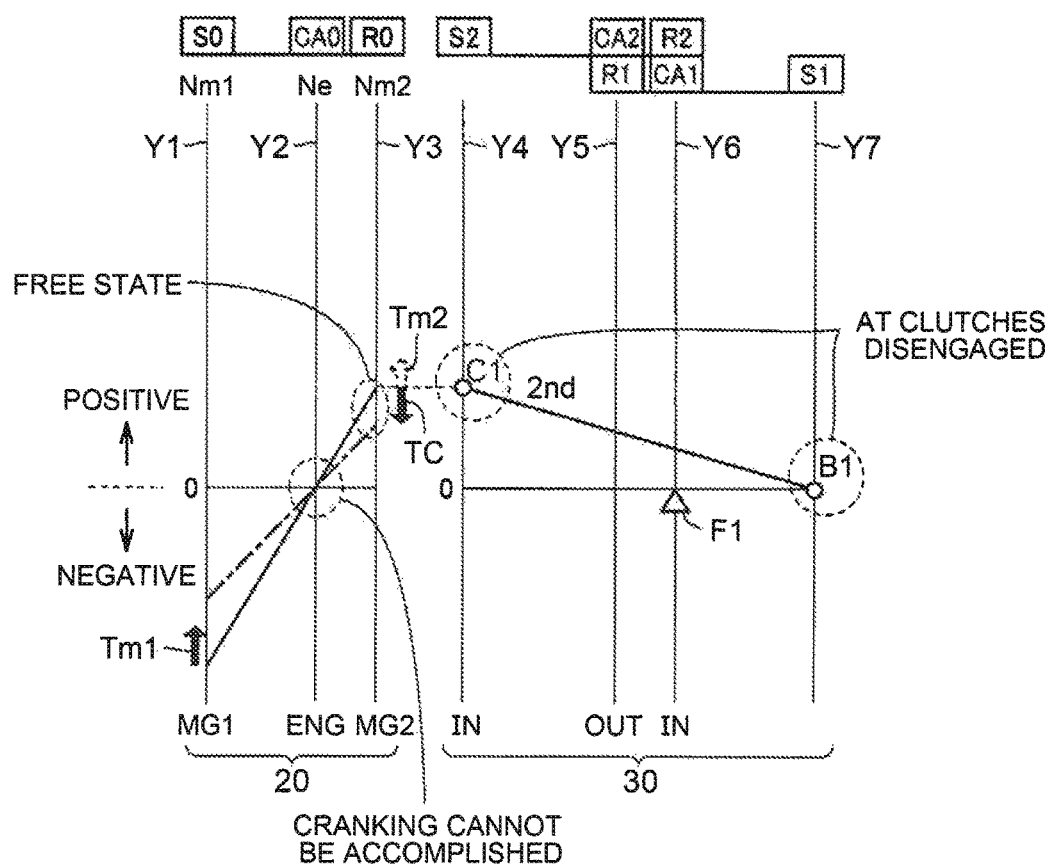
FIG. 5 is a diagram shown on a nomograph of the transmission mechanism in which one example of a state of controlling when engine start processing is performed with no AT clutch engaged while the vehicle is running inertially in an IG-off state is shown.

FIG. 5 is a diagram shown on a nomograph of the transmission mechanism in which one example of a state of controlling when engine start processing is performed with no AT clutch engaged while the vehicle is running inertially in an IG-off state is shown. In the example that is shown in FIG. 5, a case is shown where the IG-off state is established and the engine 11 is stopped because a system stop operation is performed while the vehicle is running forward with the second gear position formed.

When the IG-off state is established while the vehicle 1 is running, the engine 11 is stopped and consequently the MOP 80 also stops. In addition, because the vehicle 1 usually does not have to run in the IG-off state, the EOP 50 may be also stopped. In this case, because hydraulic pressure necessary to engage the AT clutches (in the example that is shown in FIG. 5, the clutch C1 and the brake B1 as engagement targets necessary to form the second gear position) is not supplied, the AT clutches are brought into a disengaged state.

To start the engine 11 from the running condition as shown in FIG. 5, the ECU 60 controls the motor generator MG1 to a regenerative state (a state where it functions as a generator) to cause the torque of the motor generator MG1 (which is hereinafter referred to also as "MG1 torque Tm1") to act in a positive direction in order to crank the engine 11. At this time, reactive torque of the MG1 torque Tm1 (which is hereinafter referred to also as "cranking reactive force TC") acts on the ring gear R0 in a negative direction.

At this time, no AT clutch is engaged and the ring gear R0 of the power split device 24 is in a free state in which the input shaft 31 is not connected to the driving wheels 44. In such a state, if the torque of the motor generator MG2 (which is hereinafter referred to also as "MG2 torque Tm2") can be adjusted accurately so that it can be balanced with the cranking reactive force TC, the ring gear R0 rotates at a constant speed and the engine 11 can be cranked. However, such adjustment is technically very difficult. In other words, even slight imbalance between the cranking reactive force TC and the MG2 torque Tm2 can cause the rotational speed of the ring gear R0 to increase or decrease. The dot-and-dash line that is shown in FIG. 5 shows a case in which the rotational speed of the ring gear R0 is decreased because the cranking reactive force TC is greater than the MG2 torque Tm2. When the rotational speed of the ring gear R0 is increased or decreased, a situation where the engine 11 cannot be cranked to start may occur. As a result, it is concerned that the vehicle control state cannot be returned to the Ready-ON state while the vehicle 1 is running.

To solve the above problem, the ECU 60 according to this embodiment continues operating the EOP 50 while the vehicle 1 is running in the IG-off state. This ensures that hydraulic pressure, which is necessary to bring the AT clutches into an engaged state, is supplied from the EOP 50 even when the MOP 80 stops while the vehicle 1 is running inertially in the IG-off state. Thus, when engine start processing is performed in response to a system start operation (system restart operation) while the vehicle 1 is running in the IG-off state, the AT clutches can be brought into the engaged state and the ring gear R0 of the power split device 24 can be connected to the driving wheels 44. Thus, the engine 11 can be cranked appropriately, and the engine 11 can be started easily.

Figure 6:
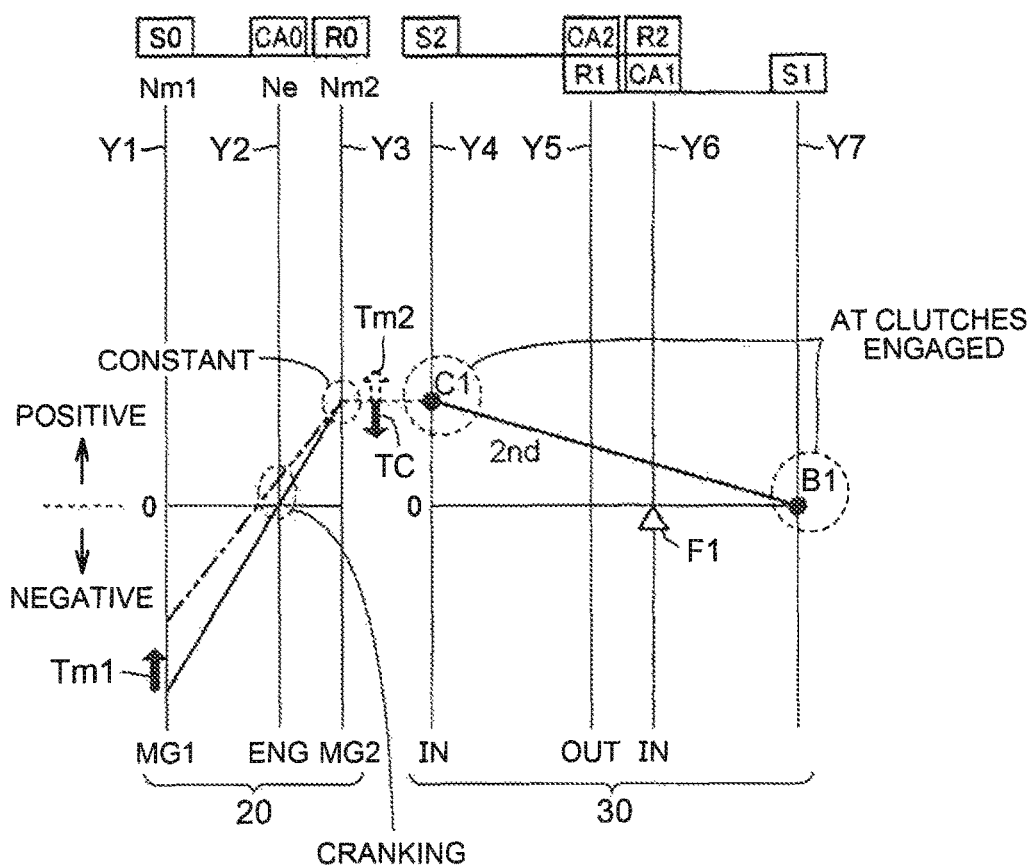
FIG. 6 is a diagram shown on a nomograph of the transmission mechanism in which one example of a control state that is established when engine start processing is performed with AT clutches engaged while the vehicle is running inertially in an IG-off state is shown.

FIG. 6 is a diagram shown on a nomograph of the transmission mechanism in which one example of a control state that is established when engine start processing is performed with AT clutches engaged while the vehicle is running inertially in an IG-off state is shown.

When the AT clutches are in the engaged state, the ring gear R0 of the power split device 24 is connected to the driving wheels 44. Thus, the cranking reactive force TC can be also received by the driving wheels 44. In this state, because the vehicle 1 has a greater inertia than the ring gear R0 of the power split device 24, the rotational speed of the ring gear R0 does not change and remains constant even when the cranking reactive force TC acts on the ring gear R0. As a result, the engine 11 can be cranked by the MG1 torque Tm1 (as shown by the chain double-dashed line).

FIG. 7 is a flowchart that illustrates one example of a processing procedure that is executed by the ECU 60. This flowchart is executed at predetermined intervals while the ECU 60 is in operation. In the following, each step is referred as reference number initiated with "S."

The ECU 60 determines whether the IG-off state has been established as a result of a system stop operation by a user (S10). If the IG-off state has not been established (NO in S10), the ECU 60 skips the subsequent processing and advances the processing to return.

If the IG-off state has been established (YES in S10), the ECU 60 determines whether the vehicle speed V is equal to or higher than a threshold value Vth (S20). This determination is made to determine whether the vehicle 1 is running inertially in the IG-off state. The threshold value Vth is a vehicle speed that is used to determine whether to permit a system restart during inertia running and may be set to a value of several km per hour, for example.

If it is determined that the vehicle speed V is lower than the threshold value Vth (NO in S20), the ECU 60 stops the EOP 50 (S24) and maintains the IG-off state (S90) because the vehicle 1 can come to a halt immediately and it is assumed that an urgent situation that requires a system restart is unlikely to occur while the vehicle 1 is running. In this case, the ECU 60 opens the SMR 27 and then opens the IGCT relay 9 to stop the vehicle system including the ECU 60 after the vehicle 1 comes to a halt. After the vehicle 1 comes to a halt, the user can restart the vehicle system to establish the Ready-ON state by performing a normal system activation operation that is performed in a state in which the vehicle 1 is stopped as usual.

If the vehicle speed V is equal to or higher than the threshold value Vth (YES in S20), the ECU 60 actuates the EOP 50 even in the IG-offstate (S22) because the vehicle 1 cannot come to a halt immediately and an urgent situation that requires a system restart may occur while the vehicle 1 is running inertially. When the EOP 50 has already been actuated, the ECU 60 continues operating the EOP 50.

Then, the ECU 60 determines whether the AT clutches are in the engaged state (S30). This determination can be made on the basis of a hydraulic pressure command value for the AT clutches being output from the ECU 60 to the hydraulic circuit 70, for example.

If the AT clutches are in the engaged state (YES in S30), the ECU 60 sets a restart-during-running permission flag to "ON." If the AT clutches are not in the engaged state (NO in S30), the ECU 60 sets the restart-during-running permission flag to "OFF." The restart-during-running permission flag is a flag that indicates whether a system restart is permitted while the vehicle 1 is running inertially in the IG-off state.

Then, the ECU 60 determines whether a system activation operation has been performed by the user (S40). If no system activation operation has been performed (NO in S40), the ECU 60 returns the processing to S20 and repeats the processing in and after S20.

If a system activation operation has been performed (YES in S40), the ECU 60 determines whether the restart-during-running permission flag is "ON" (S50). If the restart-during-running permission flag is not "ON" (NO in S50), the ECU 60 maintains the IG-off state (S90).

If the restart-during-running permission flag is "ON" (YES in S50), the ECU 60 executes processing to start the engine 11 (S60). Specifically, as described in connection with FIG. 5 and FIG. 6 above, the ECU 60 causes the MG1 torque Tm1 to act in the positive direction to crank the engine 11. When the rotational speed Ne of the engine 11 reaches a predetermined rotational speed as a result of the cranking, the ECU 60 starts supplying fuel to the engine 11 to start the engine 11.

Then, the ECU 60 determines whether the start of the engine 11 has been completed by the engine start processing (S70).

If the start of the engine 11 has been completed (YES in S70), the ECU 60 brings the vehicle control state into the Ready-ON state (S80). This enables an accelerator operation by the user to generate driving force. After the Ready-ON state is established, the ECU 60 returns the restart-during-running permission flag to a default state "OFF."

On the other hand, if the start of the engine 1 has not been completed (NO in S70), the ECU 60 determines whether the start of the engine 11 has failed (S72). For example, the ECU 60 determines that the start of the engine 11 has failed when the time that has been elapsed after the start of the engine start processing has exceeded a predetermined value.

If the engine start is not determined to have been failed (NO in S72), the ECU 60 returns the processing to S60 and continues the engine start processing.

If the engine start is determined to have been failed (YES in S72), the ECU 60 terminates the processing to start the engine 11 and maintains the IG-off state (S90).

FIG. 8 is a timing chart that illustrates one example of changes in states that occur when a system stop operation and a system start operation are performed while the vehicle 1 is running. In FIG. 8, the horizontal axis represents the time, and the vertical axis represents the IG state (IG-on state/IG-off state), the vehicle control state (Ready-ON state/Ready-OFF state), the vehicle speed V, the rotational speed Ne of the engine 11, the state of the EOP 50 (operated/stopped), the state of the AT clutches (engaged state/disengaged state), the state of the restart-during-running permission flag (ON/OFF), the MG1 torque Tm1 and the MG2 torque Tm2 from the top to the bottom.

When the user performs a system stop operation at time t1 when the vehicle 1 is running in a hybrid mode (running using the power from the engine 11 and the motor generator MG1), the Ready-OFF state is established and the IG-off state is established. Consequently, the engine 11 is stopped, and the rotational speed Ne of the engine 11 decreases. Because the engine 11 is stopped, the MOP 80 also stops.

However, because the vehicle 1 is running with the vehicle speed V higher than the threshold value Vth, the EOP 50 continues to be operated and the restart-during-running permission flag is set to "ON." The AT clutches are maintained in the engaged state by the output hydraulic pressure from the EOP 50.

After that, when the user performs a system start operation at time t2, processing to start the engine 11 is started. At this time, the AT clutches are maintained in the engaged state by the output hydraulic pressure from the EOP 50 (in other words, the ring gear R0 of the power split device 24 is connected to the driving wheels 44), the engine 11 can be cranked appropriately by causing the MG1 torque Tm1 to act in the positive direction (refer to FIG. 6 above).

After that, when it is determined at time t3 that the start of the engine 11 is completed, the ECU 60 returns the vehicle control state to the Ready-ON state. As a result, a state is established where vehicle driving force is generated in response to an accelerator operation by the user.

As described above, the ECU 60 according to this embodiment continues operating the EOP 50 while the vehicle 1 is running in the IG-off state. This prevents the vehicle 1 from falling into a situation where the engine 11 cannot be restarted even when the engine 11 is stopped by a system stop operation while the vehicle 1 is running. Specifically, even when the engine 11 is stopped and consequently the MOP 80 stops, hydraulic pressure necessary to bring the AT clutches into the engaged state can be supplied from the EOP 50. Thus, when engine start processing is performed in response to a system start operation, the AT clutches can be brought into the engaged state (which means that the ring gear R0 of the power split device 24 can be connected to the driving wheels 44). Thus, the engine 11 can be cranked appropriately, and the engine 11 can be started easily.

In addition, the ECU 60 according to this embodiment executes processing to start the engine 11 in response to a system start operation when the AT clutches are in the engaged state while the EOP 50 continues to be operated because the ring gear R0 of the power split device 24 (the input shaft 31 of the automatic transmission 30) is connected to the driving wheels 44 and therefore the engine 11 is able to be restarted. Thus, the engine 11 can be restarted even while the vehicle is running. On the other hand, when the AT clutches are not in the engaged state even while the EOP 50 continues to be operated, the ECU 60 does not perform processing to start the engine 11 regardless of a system start operation because the ring gear R0 of the power split device 24 (the input shaft 31 of the automatic transmission 30) is in a free state in which the input shaft 31 is not connected to the driving wheels 44 and therefore the engine 11 is difficult to restart. Thus, it is possible to avoid executing processing to start the engine 11 unnecessarily in a situation where the engine 11 is difficult to restart.

In addition, when the engine 11 is not started by the processing to start the engine 11, the ECU 60 according to this embodiment terminates the processing to start the engine 11 and maintains the engine 11 in a stopped state. Thus, it is possible to avoid continuing processing to start the engine 11 (cranking or the like) unnecessarily in a situation where the engine 11 cannot be restarted for some reason.

In addition, the ECU 60 of this embodiment stops the EOP 50 and maintains the engine 11 in a stopped state when the vehicle speed V falls below the threshold value Vth while the EOP 50 continues to be operated because the vehicle 1 can come to a halt immediately and it is assumed that an urgent situation that requires a system restart is unlikely to occur while the vehicle 1 is running. Thus, it is possible to avoid continuing to operate the EOP 50 unnecessarily.

In addition, as shown in FIG. 8, the ECU 60 according to this embodiment is set to continue operating the EOP 50 while the vehicle 1 is running in the IG-off state but maintains the EOP 50 in a stopped state while the vehicle 1 is running in the IG-on state before a system stop operation is performed. In addition, as shown in FIG. 8, the ECU 60 according to this embodiment is set to bring the EOP 50 into a stopped state when a certain predetermined condition is satisfied after a system start operation is performed by the user while the vehicle 1 is running in the IG-off state. The predetermined condition may be that a rotational speed of the engine 11 is equal to or higher than predetermined value, or the start of the engine 11 is determined to be completed, for example. While the vehicle 1 is running in the IG-on state before a system stop operation is performed, it is considered that hydraulic pressure necessary to operate the AT clutches can be supplied from the MOP 80, which is driven by the engine 11, because the engine 11 is operating. Therefore, the EOP 50 may be deactivated. Also, when a system start operation is performed while the vehicle 1 is running in the IG-off state and, for example, the start of the engine 11 is completed, the hydraulic pressure necessary to operate the AT clutches can be supplied from the MOP 80, which is driven by the engine 11. Therefore, the EOP 50 may be deactivated. Thus, it is possible to avoid continuing to operate the EOP 50 unnecessarily.

In the above embodiment, when a defect (such as an abnormal rotational speed or abnormal temperature rise that is caused by overheat) occurs in the EOP 50 while the EOP 50 continues to be operated, the EOP 50 may be stopped for fail-safe even if the vehicle speed V has not fallen below the threshold value Vth. In this case, because the EOP 50 is stopped, the AT clutches are disengaged and the restart-during-running permission flag is set to "OFF" (NO in S30, and S34 in FIG. 7). As a result, even when a system restart operation has been performed (YES in S40 in FIG. 7), the restart-during-running permission flag is determined to be "OFF" (NO in S50 in FIG. 7). Thus, processing to start the engine 11 (S60 in FIG. 7) is not executed, and the IG-off state is maintained (S90 in FIG. 7).

It should be understood that the embodiments disclosed herein are not restrictive but illustrative in all aspects. The scope of this disclosure is defined by the appended claims rather than by the above description, and intended to include every modification that is made within the meaning and scope equivalent to the claims.

What is claimed is:

1. A hybrid vehicle, comprising:
   a drive unit that generates driving force, the drive unit including an internal combustion engine, a first rotating electric machine, a planetary gear mechanism, and a second rotating electric machine; and a transmission that is provided between the drive unit and driving wheels, the transmission including an input shaft that is connected to the drive unit, an output shaft that is connected to the driving wheels, and engagement elements that are brought into an engaged state that allows power transmission between the input shaft and the output shaft by hydraulic pressure that is externally supplied, wherein:

the planetary gear mechanism mechanically connects the internal combustion engine, the first rotating electric machine and the input shaft of the transmission;

the second rotating electric machine is coupled to the input shaft of the transmission;

wherein the hybrid vehicle further comprises: a mechanical pump that uses power from the internal combustion engine to generate hydraulic pressure that is supplied to the engagement elements; an electrical pump that uses electric power to generate hydraulic pressure that is supplied to the engagement elements; and a controller that controls the drive unit the transmission, and the electrical pump; and wherein the controller continues operating the electrical pump while the internal combustion engine is not in operation after the internal combustion engine is stopped as a result of a system stop operation by a user while the hybrid vehicle is running at a vehicle speed equal to or higher than a predetermined value, wherein the controller performs start processing to start the internal combustion engine in response to a system start operation by the user when the engagement elements are in the engaged state while the electrical pump continues to be operated, and wherein the controller does not perform the start processing regardless of the system start operation when the engagement elements are not in the engaged state while the electrical pump continues to be operated.

2. The hybrid vehicle according to claim 1, wherein the controller stops the electrical pump and maintains the internal combustion engine in a stopped state when the vehicle speed falls below the predetermined value while the electrical pump continues to be operated.

3. The hybrid vehicle according to claim 1, wherein the controller maintains the electrical pump in a stopped state before the internal combustion engine is stopped.

4. The hybrid vehicle according to claim 1, wherein the controller terminates the start processing and maintains the internal combustion engine in a stopped state when the internal combustion engine is not started by the start processing.

5. The hybrid vehicle according to claim 1, wherein the controller maintains the electrical pump in a stopped state when a predetermined condition is satisfied after performing the start processing to start the internal combustion engine in response to the system start operation by the user.

6. The hybrid vehicle according to claim 5, wherein the predetermined condition is a condition in which a rotational speed of the internal combustion engine is equal to or higher than a predetermined rotational speed.

7. A hybrid vehicle, comprising:

a drive unit that generates driving force, the drive unit including an internal combustion engine, a first rotating electric machine, a planetary gear mechanism, and a second rotating electric machine; and a transmission that is provided between the drive unit and driving wheels, the transmission including an input shaft that is connected to the drive unit, an output shaft that is connected to the driving wheels, and engagement elements that are brought into an engaged state that allows power transmission between the input shaft and the output shaft by hydraulic pressure that is externally supplied, wherein:

the planetary gear mechanism mechanically connects the internal combustion engine, the first rotating electric machine and the input shaft of the transmission;

the second rotating electric machine is coupled to the input shaft of the transmission;

wherein the hybrid vehicle further comprises:
  a mechanical pump that uses power from the internal combustion engine to generate hydraulic pressure that is supplied to the engagement elements;
  an electrical pump that uses electric power to generate hydraulic pressure that is supplied to the engagement elements; and
  a controller that controls the drive unit, the transmission, and the electrical pump, wherein the controller maintains the electrical pump in a stopped state before the internal combustion engine is stopped, and continues operating the electrical pump while the internal combustion engine is not in operation after the internal combustion engine is stopped as a result of a system stop operation by a user while the hybrid vehicle is running at a vehicle speed equal to or higher than a predetermined value.

* * * * *